United States Patent [19]

Cohen et al.

[11] 4,238,792
[45] Dec. 9, 1980

[54] SYSTEM FOR CHANGING ALPHANUMERIC VALUES THAT ARE DISPLAYED ON CATHODE RAY TUBE SCREENS

[75] Inventors: Edwin Cohen; Charles P. L. Mortimer, both of Binghamton, N.Y.

[73] Assignee: The Singer Company, Binghamton, N.Y.

[21] Appl. No.: 959,127

[22] Filed: Nov. 9, 1978

[51] Int. Cl.³ .............................................. G06F 3/14
[52] U.S. Cl. .................................. 340/707; 340/712; 340/717
[58] Field of Search ................... 340/712, 707, 365 C, 340/717; 35/6, 9 A, 9 C, 48

[56] References Cited

U.S. PATENT DOCUMENTS

| | | | |
|---|---|---|---|
| 3,512,037 | 5/1970 | Eckert et al. | 340/707 |
| 3,569,617 | 3/1971 | Allen et al. | 340/707 |
| 3,576,574 | 4/1971 | Baskin et al. | 340/707 |
| 3,579,225 | 5/1971 | Clark | 340/707 |
| 3,670,322 | 6/1972 | Mallebrein | 340/712 |
| 3,832,790 | 9/1974 | Fryer, Jr. et al. | 35/9 A |
| 3,898,643 | 8/1975 | Ettlinger | 340/707 |
| 3,997,891 | 12/1976 | Iwamura et al. | 340/707 |
| 4,104,617 | 8/1978 | Bean et al. | 340/707 |
| 4,110,749 | 8/1978 | Janko et al. | 340/712 |
| 4,112,429 | 9/1978 | Tsuha et al. | 340/712 |
| 4,121,204 | 10/1978 | Welch et al. | 340/712 |
| 4,129,858 | 12/1978 | Hara | 340/707 |

*Primary Examiner*—Marshall M. Curtis
*Attorney, Agent, or Firm*—Douglas M. Clarkson; Ronald Reichman; Jeff Rothenberg

[57] ABSTRACT

A system that utilizes a light pen for changing the alphanumeric value of certain information that is displayed on the screen of a cathode ray tube. Certain parameters and their alphanumeric values are displayed on the CRT screens. A row of dots or other characters are drawn on the CRT screens next to the listed parameters. When the operator of this invention touches one of the dots or other characters with a light pen, the parameters next to the dots or characters will be identified and the alphanumeric value of that parameter will be either incremented or decremented at a fast or slow rate, depending upon the position of the dot in the array. Various types of arrays may be utilized.

7 Claims, 2 Drawing Figures

SYSTEM FOR CHANGING ALPHANUMERIC VALUES THAT ARE DISPLAYED ON CATHODE RAY TUBE SCREENS

The Unites States Government has rights in this invention pursuant to Contract Number N 61339-75-C-0098 awarded by the Department of the Navy.

BACKGROUND OF THE INVENTION

1. Field of the Invention

This invention relates to electronic devices and more particularly to computer input/output devices.

2. DESCRIPTION OF THE PRIOR ART

All digital computers are essentially the same. They usually comprise: an input device for entering information; a memory unit for storing information; an arithmetic and logic unit for performing computations; a control unit for causing the computer to proceed through the problem by executing the proper operations; and an output device for displaying information. Computers reduce higher mathematics to arithmetic and arithmetic to counting. Digital computers have the capacity to regulate themselves by processing information which the computer has itself produce. Once the computer has received a computer program which is precise instructions regarding the operation of the computer, the computer is ready to solve problems. The computer can organize the problem it is currently solving into separate steps. The computer can use the results obtained in one step to execute the next step, and the computer can display the answer to the problem on some output device such as a cathode ray tube (CRT) or a digital television.

Computers can be used to perform complicated scientific calculations, keep inventories, or monitor industrial processes, etc. In order to perform the foregoing functions, information must be entered into the computer. Information may be entered into a computer by means of a keyboard entry device, such as a multi-purpose display which consists of a CRT and a keyboard that has many different keys. When an operator wishes to change a numerical value that is displayed on the CRT, he identifies the displayed parameters he wants to change by depressing the keys on the keyboard in the sequential order that corresponds to the identification code of the selected parameter, and then he depresses the keys that equal the value he wants the changed parameter to have. The changed parameter is entered into the computer and displayed on the CRT. Information may also be entered into a computer by using a light pen, a CRT and a keyboard. The operator takes the light pen and points to the parameter listed on the CRT which he wants to change and depresses the keys on the keyboard that correspond to the value that he wishes the selected parameter to have. By utilizing the first method for entering information into the computer, the operator has to use a light pen, then the keyboard. This change in equipment requires the operator either to put the light pen down and then operate the keyboard or operate the light pen and keyboard with both hands. If the operator decides on the first alternative, he is wasting time putting the light pen down. If the operator selects the second method for entering information into the computer, he will be operating the equipment with both hands and consequently he may be using his less favored hand to enter information into the CRT.

The computer, CRT and keyboard are usually arranged as part of a computer operator's station. A computer operator's station usually contains all of the equipment that the operator requires to control and monitor the computer system. The reason why the operator's station contains all or most of the equipment to monitor and operate the computer is that computers are fast and expensive. Computers usually can process information quicker than the information can be entered into the computer and if the computer is monitoring some process, the information might have to be entered rapidly to insure that the process is functioning properly. Therefore, it is important that information be entered into the computer as rapidly as is possible.

SUMMARY OF THE INVENTION

This invention overcomes the disadvantages of the prior art by providing a system that permits information to be entered into computer systems and displayed on CRT's or other displays by using only the displays and a light pen or a touch sensitive digitizer. By using the apparatus of this invention, it is possible to reduce the time required for the computer operator to communicate with the computer and modify the computer's programs or make changes in the system's operation.

This invention may be used as part of a training simulator's instructor's station. A training simulator is a device that teaches students how to use and operate various types of equipment without undergoing the damages that are inherent in the equipment's actual operation. Simulation is accomplished by creating realistic replicas or using the actual equipment of the device being simulated. These replicas or actual equipment are linked to an interface which is coupled to a digital computer. The computer solves equations that actuate the controls and instrumentation of the device being simulated so that the student will experience the same sensations that would occur in the actual operation of the device with similar manipulation of its controls.

In order to permit an instructor to observe the student's progress and control what is being simulated, an operator's station or instructor's station is coupled to the digital computer. The instructor's station may consist of: a multi-purpose display with a light pen, and other controls that permit the instructor to monitor and control the student's training. Thus, if this invention is used, the instructor may readily modify the conditions under which the student is being trained and the instructor may also observe the student's reaction to these changed circumstances.

It is an object of this invention to provide a new and improved system for entering information into computers.

It is another object of this invention to provide a new and improved system that enters information into a computer and displays the information on one or more CRTs.

It is a further object of this invention to provide a new and improved system that utilizes a light pen and a CRT for entering information into a computer system.

Other objects and advantages of this invention will become more apparent as the following description proceeds, which invention should be considered together with the accompanying drawings.

DESCRIPTION OF A PREFERRED EMBODIMENT

Figure 1:
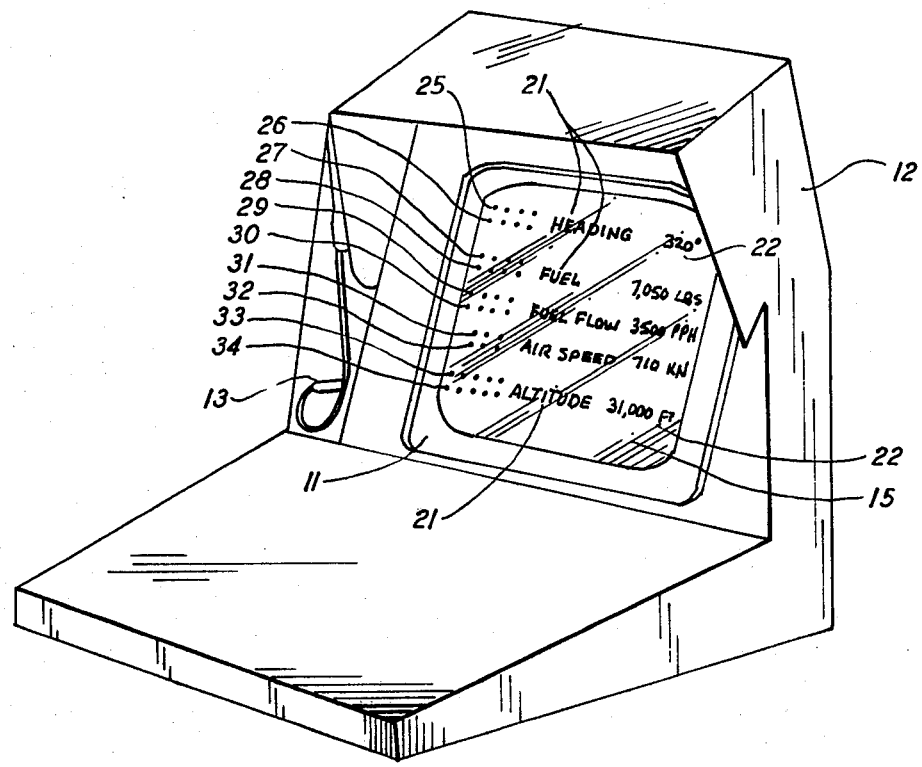
FIG. 1 is a perspective representation of a CRT and its associated console in which information is displayed by this invention.

Referring to the drawings in detail, and more particularly to FIG. 1, the reference character 11 represents a CRT that is contained within Console 12. Light pen 13 may be stored in Console 12. Appearing on Screen 15 of CRT 11 is certain specified information 21 that pertains to an aircraft, i.e., heading, fuel, fuel flow, air speed, and altitude and the present numeric value of that specified information 22. To the left of each of the listed specified information 21 are rows of dots 25, 26, 27, 28, 29, 30, 31, 32, 33, and 34. If the operator of this invention touches a dot in lines 25, 27, 29, 31 and 33 with light pen 13, the value of the specified information 22 will increase at a fixed rate, and if the operator of this invention touches a dot in line 26, 28, 30, 32 and 34 with light pen 13, the value of the specified information 22 will decrease at a fixed rate. Once the light pen 13 is removed from rows of dots 25 through 34, the value of the specified information 22 stops changing. The magnitude of the rate of change of values 22 depends upon which dot in lines 25 through 34 was touched by light pen 13, the leftmost dot will effect the most rapid change (typically resulting in incrementing or decrementing the most significant digit of value 22 two or three times per second). If the rightmost dot in lines 25 through 34 were touched with light pen 13, the least significant digit of value 22 will be incremented or decremented two or three times per second. Rows of dots 25 through 34 contain a number of dots equal to the number of digits that values 22 may have. For instance, the heading of the air craft may be between 0 to 359 degrees, therefore there are three dots in row 25 and three dots in row 26. Rows 27 and 28 each have four dots because the maximum amount of fuel the aircraft can carry is 9,999 pounds of rows 29 and 30 each have four dots because the rate of fuel flow is approximately 3,500 pounds per hour. The maximum air speed of the aircraft is 800 knots, hence rows 31 and 32 each contain three dots. The maximum altitude of the aircraft is approximately 60,000 feet, hence rows 33 and 34 each contain five dots. This method of dot arrangement allows the operator to easily change the displayed value 22 by moving the light pen towards the right as he approaches the desired values, and correcting overshoots by shifting to the other line of dots.

Figure 2:
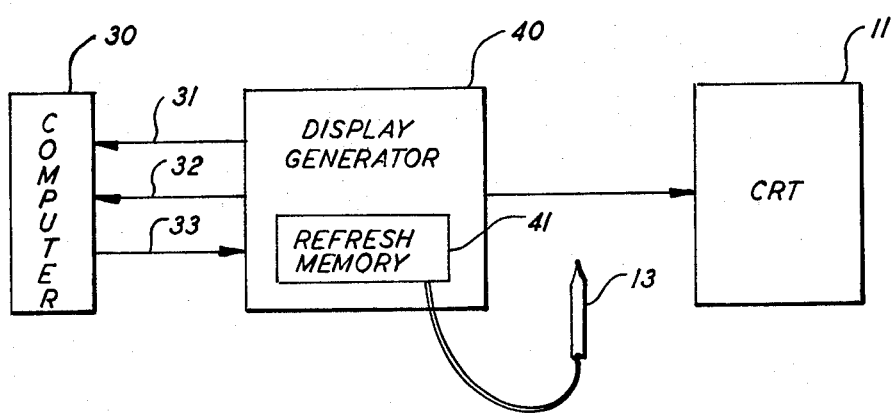
FIG. 2 is a block diagram of the electrical system that comprises a part of this invention.

FIG. 2 shows the manner in which CRT 11 is coupled to the rest of this invention. The information that is displayed on the screen of CRT 11 must be updated between thirty and sixty times a second to prevent an observer of the CRT from seeing a flickering picture. In order to display a page of written matter on the screen of CRT 11, display generator 40 is coupled to CRT 11 and tells CRT 11 between 30 and 60 times a second what alphanumeric characters and/or symbols are going to be displayed on the CRT screen and the position of these alphanumeric characters on the CRT screen. This positioning and alphanumeric characters and symbol determination is determined by a display list. A display list is a list of instructions that tells display generator 40 what to do. Display generator 40 defines the screen of CRT 11 in terms of cartesian coordinates. Thus, each position on the screen of CRT 11 can be defined by two coordinates and the positioning of each alphanumeric character or symbol can be specified by stating two coordinates. Each instruction on the display list specifies the position of one alphanumeric character or symbol and the alphanumeric character or symbol that is going to be drawn at the position. Display generator 40 starts at the beginning of the display list and executes each instruction in numeric order until the display list is complete. The display generator will complete the display list between thirty and sixty times a second. The display list is stored in the refresh memory 41. Refresh memory 41 is part of display generator 40, and refresh memory 41 receives the display list from computer 30 via line 33.

Light pen 13 is coupled to display generator 40. Contained within light pen 13 is a photo sensitive element that is activated when the tip of light pen 13 is placed against the screen of CRT 11. The moment the aforementioned photo sensitive element is activated, light pen 13 sends an electrical signal to display generator 40. Thereupon generator 40 transmits an interrupt signal to computer 30 via line 31. The interrupt signal informs computer 30 that the point on the screen of CRT 11 in which light pen 13 was placed is going to be defined by two coordinates which are going to be transmitted to computer 30 via line 31. The display list is contained within the memory of computer 30 so that computer 30 will know the position on the screen of CRT 11 of each dot contained in rows 25 through 34 (shown in FIG. 1). Also contained within the memory of computer 30 is a subroutine that causes certain information contained within the display list to be updated at a certain rate when one of the dots hereinbefore described is touched with light pen 13. Computer 30 will only enter this subroutine when one of the dots is touched by light pen 13. The updated display list will be transmitted to refresh memory 41 via line 33 and generator 40 will continue to process each instruction in numeric order to insure that the new information together with the old information that was not changed appears on the screen of the CRT 11.

The above specification describes a new and improved system for changing the information that appears on CRT's. It is realized that the above description may indicate to those skilled in the art additional ways in which the principles of this invention may be used without departing from its spirit. It is, therefore, intended that this invention be limited only by the scope of appended claims.

What is claimed is:

1. A computer controlled display system that is coupled to an instructor's station in a training simulator for changing the alphanumeric value of information that appears on the screen of a display system, said system comprising:

at least one display device that displays alphanumeric characters, symbols and geometric shapes on its screen, the information displayed on the screen of the display device is arranged such that a plurality of geometric shapes are displayed in a position related to a group of alphanumeric characters and/or symbols that represent a parameter and its value;

display generating means for causing information to be displayed on the screen of said display device at predetermined locations, said display generating means being coupled to said display device;

at least one light pen coupled to said generating means and capable of touching the geometric shapes that appear on the screen of said display device; and a computer that contains a list of alphanumeric characters and symbols and a series of mathematical relationships that permit the value of the displayed parameter to be in the memory of said computer and on the screen of said display changed at predetermined rates, whereby, when said light pen is placed against one of said geometric shapes, the value of one of said displayed parameters is changed at one rate in the memory of said computer and on the screen of said display device and when said light pen is placed against another one of said geometric shapes, said value is changed at a different rate.

2. The system defined in claim 1 wherein said display is a cathode ray tube.

3. The system defined in claim 1 wherein said display device is a digital television.

4. The system defined in claim 1 wherein said geometric shapes are dots.

5. The systems defined in claim 4 wherein said dots are arranged in two rows, where one row of dots will be used only for increasing the value of said parameter and the other row of dots will be used only for decreasing the value of said parameter.

6. The system defined in claim 5 wherein each of said dots represents a different rate in which the value of said parameter will be increased or decreased.

7. A computer controlled display system that is coupled to an instructor's station in a training simulator for modifying the alphanumeric value of information that appears on the screen of a display system, said system comprising:

at least one display device that displays alphanumeric characters, symbols and geometric shapes on its screen, the information displayed on the screen of the display device is arranged such that a predetermined number of geometric shapes are displayed next to or in a position related to a group of alphanumeric characters and/or symbols that represent a parameter and its value;

display generating means for causing information to be displayed on the screen of said display device at certain specified and predetermined locations, said display generating means being coupled to said display device;

at least one touch-sensitive digitizer; and a computer that contains a list of alphanumeric characters and symbols and a series of mathematical relationships that permit the value of the displayed parameter to be modified at predetermined rates that are different for each of said geometric shapes, whereby, when one of said geometric shapes on said digitizer is touched by the operator the value of one of said displayed parameters is modified at one rate in the memory of said computer and on the screen of said display.

* * * * *